US009857459B2

(12) United States Patent
Tuxen (10) Patent No.: US 9,857,459 B2
(45) Date of Patent: Jan. 2, 2018

(54) METHOD AND AN APPARATUS FOR DETERMINING A DEVIATION BETWEEN AN ACTUAL DIRECTION OF A LAUNCHED PROJECTILE AND A PREDETERMINED DIRECTION

(71) Applicant: TRACKMAN A/S, Vedbæk (DK)

(72) Inventor: Fredrik Tuxen, Hørsholm (DK)

(73) Assignee: TRACKMAN A/S, Vedbæk (DK)

( * ) Notice: Subject to any disclaimer, the term of this patent is extended or adjusted under 35 U.S.C. 154(b) by 372 days.

(21) Appl. No.: 14/536,827

(22) Filed: Nov. 10, 2014

(65) Prior Publication Data

US 2016/0170015 A1    Jun. 16, 2016

Related U.S. Application Data

(60) Continuation of application No. 13/303,889, filed on Nov. 23, 2001, now Pat. No. 8,912,945, which is a
(Continued)

(51) Int. Cl.
*G01S 13/58* (2006.01)
*G01S 13/86* (2006.01)
(Continued)

(52) U.S. Cl.
CPC .............. *G01S 13/58* (2013.01); *G01S 13/72* (2013.01); *G01S 13/867* (2013.01); *G01S 7/52* (2013.01); *G01S 13/66* (2013.01); *G01S 13/88* (2013.01)

(58) Field of Classification Search
CPC ..... G01S 7/52; G01S 7/02; G01S 7/28; G01S 7/285; G01S 7/295; G01S 7/2955;
(Continued)

(56) References Cited

U.S. PATENT DOCUMENTS 3,025,520 A    3/1962    Werner et al.
3,264,643 A    8/1966    Nilssen
(Continued)

FOREIGN PATENT DOCUMENTS

DE    26 20 991    3/1977
EP    0 116 183    8/1984
(Continued)

OTHER PUBLICATIONS

"Trackman System Used to Track Tiger Wood's ball at US Open," Jul. 15, 2008, Retrieved from the Internet: URL: http://www.youtube.com/watch?v=0esAOPRZaVg [retrieved on Mar. 29, 2011].
(Continued)

*Primary Examiner* — Bernarr E Gregory
(74) *Attorney, Agent, or Firm* — Fay Kaplun & Marcin, LLP (57) ABSTRACT

A method and apparatus for determining a deviation between an actual direction of a launched projectile and a predetermined direction includes providing, using a camera fixed to a radar, an image representing a target area, receiving an indication of a position in the image, the indicated position corresponding to a position in the target area, determining, using a radar, the actual direction of the projectile, determining a launch position of the projectile, determining, from the launch position and the corresponding position, the predetermined direction and determining the deviation between the actual direction of the projectile and the predetermined direction. The indicating step include rotating the camera and radar to have the position in the target area presented at a center or with a predetermined offset form the center in the image.

10 Claims, 5 Drawing Sheets

Related U.S. Application Data division of application No. 11/630,904, filed as application No. PCT/DK2005/000456 on Jul. 1, 2005, now Pat. No. 8,085,188.

(60) Provisional application No. 60/584,483, filed on Jul. 2, 2004.

(51) Int. Cl.
  *G01S 13/72* (2006.01)
  *G01S 13/66* (2006.01)
  *G01S 13/88* (2006.01)
  *G01S 7/52* (2006.01)
  *G01S 13/00* (2006.01)

(58) Field of Classification Search
  CPC . G01S 7/42; G01S 13/02; G01S 13/50; G01S 13/58; G01S 13/66; G01S 13/72; G01S 13/86; G01S 13/867; G01S 13/88; F41G 7/20; F41G 7/22; F41G 7/2213; F41G 7/2226; F41G 7/2246; F41G 7/2286; F41G 7/2293; G06K 9/36; G06K 9/54; G06K 9/56
  See application file for complete search history.

(56) References Cited

U.S. PATENT DOCUMENTS

| | | |
|---|---|---|
| 3,324,468 A | 6/1967 | Knepper |
| 3,540,054 A | 11/1970 | Broderick |
| 3,777,665 A | 12/1973 | Ziemba |
| 3,798,644 A | 3/1974 | Constant |
| 3,798,795 A | 3/1974 | Michelsen |
| 3,856,237 A | 12/1974 | Torian et al. |
| 3,974,740 A | 8/1976 | Billottet et al. |
| 3,981,010 A | 9/1976 | Michelsen |
| 3,992,708 A | 11/1976 | Olson et al. |
| 4,015,258 A | 3/1977 | Smith et al. |
| 4,050,068 A | 9/1977 | Berg et al. |
| 4,264,907 A * | 4/1981 | Durand, Jr. ............ F41G 7/2293 244/3.15 |
| 4,477,814 A * | 10/1984 | Brumbaugh .......... F41G 7/2293 342/53 |
| 4,509,052 A | 4/1985 | Cash |
| 4,545,576 A | 10/1985 | Harris |
| 4,563,005 A | 1/1986 | Hand et al. |
| 4,622,554 A | 11/1986 | Gellekink et al. |
| 4,639,733 A | 1/1987 | King et al. |
| 4,713,686 A | 12/1987 | Ozaki et al. |
| 4,717,916 A | 1/1988 | Adams et al. |
| 4,751,511 A | 6/1988 | Komata et al. |
| 4,780,719 A | 10/1988 | Frei et al. |
| 5,018,218 A * | 5/1991 | Peregrim ................ G06K 9/56 342/62 |
| 5,056,791 A | 10/1991 | Poillon et al. |
| 5,092,602 A | 3/1992 | Witler et al. |
| 5,134,409 A | 7/1992 | Groot |
| 5,138,322 A | 8/1992 | Nuttall |
| 5,150,895 A | 9/1992 | Berger |
| 5,241,317 A | 8/1993 | Howard |
| 5,246,232 A | 9/1993 | Eccher et al. |
| 5,290,037 A | 3/1994 | Witler et al. |
| 5,319,373 A | 6/1994 | Maxwell et al. |
| 5,341,142 A * | 8/1994 | Reis ...................... F41G 7/2226 244/3.15 |
| 5,342,051 A | 8/1994 | Rankin et al. |
| 5,357,255 A | 10/1994 | Giraudy |
| 5,375,832 A | 12/1994 | Witler et al. |
| 5,401,026 A | 3/1995 | Eccher |
| 5,404,144 A | 4/1995 | Vlannes |
| 5,406,290 A | 4/1995 | James et al. |
| 5,413,345 A | 5/1995 | Nauck |
| 5,486,002 A | 1/1996 | Witler et al. |
| 5,489,099 A | 2/1996 | Rankin et al. |
| 5,495,249 A | 2/1996 | Chazelle et al. |
| 5,609,534 A | 3/1997 | Gebhardt et al. |
| 5,631,654 A | 5/1997 | Karr |
| 5,652,588 A | 7/1997 | Miron |
| 5,657,027 A | 8/1997 | Guymon |
| 5,700,204 A | 12/1997 | Teder |
| 5,781,505 A | 7/1998 | Rowland |
| 5,796,474 A | 8/1998 | Squire et al. |
| 5,803,823 A | 9/1998 | Gobush et al. |
| 5,846,139 A | 12/1998 | Bair et al. |
| 5,868,578 A | 2/1999 | Baum |
| 5,873,040 A | 2/1999 | Dunn et al. |
| 5,879,246 A | 3/1999 | Gebhardt et al. |
| 5,912,700 A | 6/1999 | Honey et al. |
| 5,952,957 A | 9/1999 | Szu |
| 6,042,492 A | 3/2000 | Baum |
| 6,057,915 A | 5/2000 | Squire et al. |
| 6,067,039 A | 5/2000 | Pyner et al. |
| 6,133,946 A | 10/2000 | Cavallaro et al. |
| 6,179,720 B1 | 1/2001 | Rankin et al. |
| 6,198,501 B1 | 3/2001 | Nemiroff et al. |
| 6,239,747 B1 | 5/2001 | Kaminski |
| 6,244,971 B1 | 6/2001 | Mihran |
| 6,252,632 B1 | 6/2001 | Cavallaro |
| 6,266,005 B1 | 7/2001 | Schneider |
| 6,292,130 B1 | 9/2001 | Cavallaro et al. |
| 6,304,665 B1 | 10/2001 | Cavallaro et al. |
| 6,320,173 B1 | 11/2001 | Vock et al. |
| 6,371,862 B1 | 4/2002 | Reda |
| 6,400,306 B1 | 6/2002 | Nohara et al. |
| 6,421,116 B1 * | 7/2002 | Schilli .................... F41G 7/2226 244/3.16 |
| 6,450,442 B1 | 9/2002 | Schneider et al. |
| 6,456,232 B1 | 9/2002 | Milnes et al. |
| 6,520,864 B1 | 2/2003 | Wilk |
| 6,547,671 B1 | 4/2003 | Mihran |
| 6,592,465 B2 | 7/2003 | Lutz |
| 6,621,561 B2 | 9/2003 | Holton |
| 6,764,412 B2 | 7/2004 | Gobush et al. |
| 6,778,148 B1 | 8/2004 | Pack et al. |
| 6,791,217 B2 | 9/2004 | Collier-Hallman et al. |
| 6,816,185 B2 | 11/2004 | Harmath |
| 6,903,676 B1 | 6/2005 | Frady |
| 6,956,523 B2 | 10/2005 | Mohan |
| 6,989,789 B2 | 1/2006 | Ferreol et al. |
| 7,026,990 B2 | 4/2006 | Cooper et al. |
| 7,031,873 B2 | 4/2006 | Song |
| 7,133,801 B2 | 11/2006 | Song |
| 7,161,733 B2 | 1/2007 | Fukata et al. |
| 7,183,966 B1 * | 2/2007 | Schramek ............. F41G 7/2246 244/3.1 |
| 7,213,442 B2 | 5/2007 | Workman |
| 7,321,330 B2 | 1/2008 | Sajima |
| 8,054,216 B2 | 11/2011 | Kinoshita et al. |
| 8,085,188 B2 | 12/2011 | Tuxen |
| 8,189,857 B2 | 5/2012 | Johnson et al. |
| 8,461,965 B2 | 6/2013 | Chen et al. |
| 8,665,153 B2 | 3/2014 | Nakagawa et al. |
| 8,845,442 B2 | 9/2014 | Tuxen |
| 8,866,665 B2 | 10/2014 | Suzuki |
| 8,912,945 B2 | 12/2014 | Tuxen |
| 9,036,864 B2 | 5/2015 | Johnson et al. |
| 9,645,235 B2 | 5/2017 | Tuxen |
| 2002/0075475 A1 | 6/2002 | Holton |
| 2002/0107078 A1 | 8/2002 | Collins |
| 2002/0114493 A1 | 8/2002 | McNitt et al. |
| 2003/0076255 A1 | 4/2003 | Ono |
| 2003/0103684 A1 | 6/2003 | Gobush et al. |
| 2004/0032970 A1 | 2/2004 | Kiraly |
| 2004/0156035 A1 | 8/2004 | Rogers |
| 2004/0248662 A1 | 12/2004 | Gobush et al. |
| 2005/0030222 A1 | 2/2005 | Steudel |
| 2005/0030333 A1 | 2/2005 | Takahashi et al. |
| 2006/0092075 A1 | 5/2006 | Bruce et al. |
| 2006/0169932 A1 | 8/2006 | Fukata et al. |
| 2007/0167247 A1 | 7/2007 | Lindsay |
| 2007/0293331 A1 | 12/2007 | Tuxen |
| 2008/0048907 A1 | 2/2008 | Matsuura et al. |
| 2008/0068463 A1 | 3/2008 | Claveau et al. |

(56) References Cited

U.S. PATENT DOCUMENTS

| | | | |
|---|---|---|---|
| 2008/0139330 | A1 | 6/2008 | Tuxen |
| 2008/0261711 | A1 | 10/2008 | Tuxen |
| 2009/0295624 | A1 | 12/2009 | Tuxen |
| 2011/0286632 | A1 | 11/2011 | Tuxen |
| 2013/0271323 | A1 | 10/2013 | Joo et al. |
| 2013/0346009 | A1 | 12/2013 | Winter et al. |
| 2014/0191896 | A1 | 7/2014 | Johnson et al. |
| 2014/0347212 | A1 | 11/2014 | Tuxen |
| 2016/0170015 | A1 | 6/2016 | Tuxen |
| 2016/0243423 | A1 | 8/2016 | Tuxen et al. |
| 2016/0247292 | A1 | 8/2016 | Tuxen et al. |
| 2016/0306035 | A1 | 10/2016 | Johnson |
| 2016/0306036 | A1 | 10/2016 | Johnson |
| 2016/0306037 | A1 | 10/2016 | Johnson |
| 2016/0313441 | A1 | 10/2016 | Tuxen |
| 2016/0320476 | A1 | 11/2016 | Johnson |
| 2016/0339320 | A1 | 11/2016 | Johnson et al. |

FOREIGN PATENT DOCUMENTS

| | | | |
|---|---|---|---|
| EP | 0529489 | | 3/1993 |
| EP | 1 158 270 | | 11/2001 |
| GB | 2 283 144 | A | 4/1995 |
| GB | 2 294 403 | | 5/1996 |
| GB | 2319834 | | 6/1998 |
| GB | 2380682 | | 4/2003 |
| JP | 59-137873 | | 8/1984 |
| JP | 06-126015 | | 5/1994 |
| JP | 06213989 | | 8/1994 |
| JP | 08/266701 | | 10/1996 |
| JP | 2000230974 | | 8/2000 |
| JP | 2001-74837 | A | 3/2001 |
| JP | 2001305528 | | 10/2001 |
| JP | 2003-098255 | | 4/2003 |
| JP | 2003-294777 | A | 10/2003 |
| JP | 2007163321 | | 6/2007 |
| JP | 2008249354 | | 10/2008 |
| WO | 90/08936 | A1 | 8/1990 |
| WO | 91/06348 | | 5/1991 |
| WO | 93/04382 | A1 | 3/1993 |
| WO | 99/27384 | | 6/1999 |
| WO | 00/62090 | A1 | 10/2000 |
| WO | 02/25303 | | 3/2002 |
| WO | 03/005281 | | 1/2003 |
| WO | 03/032006 | | 4/2003 |
| WO | 2004/031680 | A1 | 4/2004 |
| WO | 2005/017553 | | 2/2005 |
| WO | 2005/081014 | | 9/2005 |
| WO | 2005/116678 | A2 | 12/2005 |
| WO | 2006/002639 | A1 | 1/2006 |
| WO | 2006/002640 | A1 | 1/2006 |
| WO | 2010125790 | | 11/2010 |
| WO | 2011092813 | | 8/2011 |

OTHER PUBLICATIONS

U.S. Office Action dated May 28, 2013, issued in U.S. Appl. No. 13/138,167.
U.S. Office Action dated Oct. 16, 2013, issued in U.S. Appl. No. 13/138,167.
U.S. Office Action dated Apr. 24, 2012, issued in U.S. Appl. No. 13/303,889.
U.S. Office Action dated Oct. 8, 2013, issued in U.S. Appl. No. 13/303,889.
U.S. Office Action dated Mar. 31, 2014, issued in U.S. Appl. No. 13/138,167.
Lolck, Jens-Erik. "TERMA Elektronik AS: Doppler Radar Spin Measurement," Brochure (1986).
"DR 5000 User's Guide: DR 5000 Spin Calculation," pp. 27-45 and 48-59 (2004).
Bosse et al., "Improved radar tracking using a multipath model: maximum likelihood compared with eigenvector analysis," IEEE Proc. Radar, Sonar Navig., vol. 141, No. 4, pp. 213-222 (Aug. 1994).
U.S. Notice of Allowance dated Jul. 18, 2014, issued in U.S. Appl. No. 11/885,280.
U.S. Notice of Allowance dated Jul. 14, 2014, issued in U.S. Appl. No. 13/303,889.
Zhang Ruoyo et al., "Radar Reflected Signal Process of High Spinning Rate Projectiles," The Eighth International Conference on Electronic Measurement and Instruments, 2007, pp. 3-982-985.
Ye Wei et al., "A New Method for Spin Estimation Using the Data of Doppler Radar," Proceedings ofICSP, 2000, pp. 1911-1914.
Katsuhiko Masuda et al., "Measurement of Initial Conditions of a Flying Golf Ball," WEAM 4-4, 1994, pp. 344-347.
John K. Christensen et al., "Doppler-Surface Mapping Technique for Characterisation of Spinning CylindeJ:s Illuminated by Radar," A&E Systems Magazine, Aug. 2005, pp. 19-24.
Soon-Huat Ong et al., "Signal-Adapted Wavelets for Doppler Radar System," Seventh Annual Conference on Control, Dec. 2002, pp. 19-23.
"Technology." Zelocity, Go\fPerformance Monitors.—http://www.zelocity.com/golf/techno\ogy.shtml. Copyright 2004-2006. Retrieved Jun. 9, 2010.
"3D Doppler Ball Traking Monitors, Golf Radars and Launch Monitors." Flightscopehttp://www.flightscope.com/index.php/About-US/about-us.html. Copyright 2009. Retrieved Jun. 9, 2010.
Blackaby, "Simultaneous RF/EO tracking and characterization of dismounts", MSc Thesis, 2008, 52 Sheets.
Fasano et al., "Radar/electro-optical data fusion for non-cooperative UAS sense and avoid", Aerospace Science and Technology, 2015, vol. 46, pp. 436-450.
Warthman; Technical Note D-1138: Project Echo—Boresight Cameras for recording antenna point accuracy; NASA, Sep. 1961, 14 sheets.

* cited by examiner

METHOD AND AN APPARATUS FOR DETERMINING A DEVIATION BETWEEN AN ACTUAL DIRECTION OF A LAUNCHED PROJECTILE AND A PREDETERMINED DIRECTION

CROSS-REFERENCE TO RELATED APPLICATIONS

This application is a continuation of U.S. application Ser. No. 13/303,889, filed on Nov. 23, 2011, now U.S. Pat. No. 8,912,945, which is a divisional of U.S. application Ser. No. 11/630,904, filed on Jul. 20, 2009, now U.S. Pat. No. 8,085,188, which is a National Phase entry of PCT Application No. PCT/DK2005/000456, filed on Jul. 1, 2005, which claims priority under 35 U.S.C. §119(e) to U.S. Provisional Application No. 60/584,483, filed on Jul. 2, 2004, in the U.S. Patent and Trademark Office, the entire contents of all of which are incorporated herein by reference.

BACKGROUND OF THE INVENTION

Field of the Invention

The present invention relates to the determination of a deviation between an actual direction and a desired direction of a launched projectile, such as a golf ball I another type of sports ball, or a projectile launched by a weapon.

More particularly, the desired direction is indicated using an image of a target area toward which the projectile is launched or is intended to be launched.

SUMMARY OF THE INVENTION

In a first aspect, the invention relates to a method of determining a deviation between an actual direction of a launched projectile and a predetermined direction, the method comprising:
  providing an image representing a target area,
  indicating a position in the image, the indicated position corresponding to a position in the target area,
  determining the actual direction of the projectile,
  determining a launch position of the projectile,
  determining, from the launch position and the corresponding position, the predetermined direction, and
  determining the deviation between the actual direction of the projectile and the predetermined direction.

In the present context, an image may be an actually taken image (taken using e.g. a camera) representing the target area, or it may represent more schematically the target area or parts therein, such as a number of elements present in the target area (trees, flags, houses or other identifiable elements).

The target area is normally an area, including all elements therein, as defined either by boundaries of the image or defined by elements in or at the area. Alternatively, the target area needs not be directly defined with boundaries but is merely an area surrounding or comprising the position corresponding to the indicated position.

The position in the target area normally is a position in or at the ground plane of the target area. This, however, is not required. Any position, such as on a vertical part in the target area (such as a target provided on a tree, a wall or the like) may be used as well as any elevated or lowered position (a roof or the like).

The correlation of the position in the image to the position in the target area will depend on the actual type of image and the angle from which the target area is represented in the image. Normally, there is a one-to-one correspondence between positions in the image and in the target area, when the image is of a type representing the target area when viewed from a certain position. Normally, this position will be the position, or a position close to, where the indication is performed in order to facilitate the selection or indication of the position in the image. Then, the image indicates the target area as seen from that position.

Alternatively, the image may represent the target area, such as seen from the air in the manner as maps are normally drawn.

It is noted that the projectile needs not hit or land in the target area and it needs not be aimed at the target area. The position indicated in the target area is in the desired direction, but the actual path desired may extend further or not as far as the target area.

Presently, the projectile may be any flying object, such as a sports ball (golf ball, base ball, foot ball, hand ball, basket ball), or a projectile launched by a weapon (hand gun, machine gun, missile, grenade) or the like.

The launch position may be a position from which the projectile was launched either by being hit (such as by a club, a bat, a hand or a foot), released from a hand then being thrown, launched from a launch pad, such as a barrel of a weapon, a tee fixing the ball before launch, or a surface on which the projectile rests before launch.

The launch position may be determined in a number of manners. One manner is to simply assume or dictate that the launch takes place at a predetermined position or within a predetermined area.

Another manner of providing the launch position is to have the launch position also within the image, where a plurality of images are taken, and a difference therein is identified corresponding to the projectile having been launched. This difference may be the projectile missing in a later image compared to one or more images taken before launch.

The actual direction of the projectile is the direction of the projectile while in flight. The direction may be derived from the actual path of the projectile. The direction may be determined in a predetermined plane, in that the direction may vary in a 3-D scenario (such as the path of a golf ball) but where the most interesting direction is that of the 3D path projected on to the ground plane.

In the present context, the deviation may be determined in any suitable manner. This deviation may be determined in a predetermined plane in which also the directions have been projected, if required. This is often a horizontal plane or a plane of the ground between the launch position and the position corresponding to the indicated position.

The deviation may be an angular deviation between the two directions, such as in a predetermined plane. The plane may be both horizontal and/or vertical, or deviations in multiple planes may be provided.

Alternatively or in addition, the deviation may be a distance, such as in a predetermined plane, between the actual direction and the corresponding position or between the predetermined direction and e.g. a landing point (see below) of the projectile.

In a preferred embodiment, step 1) comprises providing, with a camera, the image of the target area. The image may be provided as a video sequence, such as in real time, of the target area or may be a still image, such as an Image on a monitor or display, or represented as a hard copy.

Normally, the camera will be positioned close to a position where the position in the image is indicated. This indication may be an indication on a display or monitor, which may be a touch pad or other touch sensitive display means, whereby indication may be performed simply by touching the position in the image. Alternatively, a pointing device may be used, such as a computer mouse, an optical pen, or the like.

In general, a computer or other calculating means may be used for controlling the determination, the indication! the providing or taking of the image, the pointing, and the like.

In one embodiment, step 1) comprises providing an image comprising a plurality of predetermined positions, and step 2) comprises indicating one of the predetermined positions. In this manner, the correlation between positions in the image and the target area may be simpler and may merely be a table describing the correlation. In fact, the positions may have simple numbers, and the selecting of a position may be the selection or indication, such as on a keyboard, of a number.

A particular aspect of this embodiment is one wherein the target area comprises a plurality of predetermined elements, wherein step 1) comprises providing an image illustrating or identifying the plurality of predetermined elements at positions corresponding to positions of the elements in the target area, and wherein step 2) comprises indicating a position of one of the predetermined elements (or indicating the element in the image).

The above embodiment using the providing of a number for each position may equally well be used here.

These positions in the image then correspond to physical elements or demarcations in the target area. In this situation, the plurality of positions in the image and any corresponding physical means/elements of the target area may be sufficient for a user to be able to indicate a desired position, whereby the requirements to the image may be reduced. The mere structure and inter-relation between the individual elements and positions may be sufficient for the user to identify the desired element/position. Thus, the image may be a more simple or schematic and only (or at least) represent selected elements or all the elements corresponding to the positions in the image.

Also, this means that the same set-up may be used in order to provide a plurality of predetermined directions and to launch multiple projectiles and determine multiple deviations.

In the above embodiment, a plurality of elements is visible in the image and in the target area. Naturally, a single such element may also be used.

In this situation, the element at the position corresponding to the indicated position may have a visible part having a predetermined size. Then, step 2) could comprise:

a) determining, from the image, an angle to the indicated element and b) determining, from the image, a distance from a predetermined position to the indicated element by correlating an extent of the visible part in the image with the predetermined size thereof, the corresponding position being determined on the basis of the angle and the distance.

Knowing the angle and the distance will enable a determination of the position of the element from the image alone. The width of the predetermined size in the image provides the distance measure. The visible part may be e.g. a part at the end of a stick or pole fixed to the ground or may be a predetermined distance from the ground to the element.

The predetermined point may be a center of the image or a point fixed in relation to the target area.

In an interesting embodiment, step 3) comprises determining a landing point of the projectile and the actual direction of the projectile is determined from the launch position and the landing point. Determination of the landing point may be performed in a number of manners. The presently preferred manner is described in the applicants co-pending PCT/DK2005/000336, which is incorporated herein by reference.

A preferred manner of actually determining the path or direction of the projectile is one wherein step 3) comprises:

receiving radiation transmitted by or reflected by the projectile while it is in flight and determining, from the received radiation, a direction of the projectile.

This may be a RADAR system or any other system using radiation (or sound) for determining the position/path/direction of a projectile.

Naturally, the radiation from the projectile may be emitted from the projectile or may be reflected there from. In the latter situation, the set-up may further comprise a step of providing radiation toward the projectile in order to have the projectile reflect this for it to be determined.

In this embodiment, step 4) may comprise determining the launch position from the radiation received. A number of manners exist for this. One manner is to determine the actual point in time of launch using e.g. a microphone, where the launch position may then be determined from the direction or path of the projectile.

In that situation, the positioning or position determination in the RADAR (or similar) system is preferably fixed or has a predetermined relation to the image or image generation in order for the launch position (and optionally landing position) to be related to the position identified in the image. This relation may be provided by simply fixing the image generation (if provided e.g. as a camera) to the RADAR system (or at least the radiation receiver(s)).

In a second aspect, the invention relates to an apparatus for determining a deviation between an actual direction of a launched projectile and a predetermined direction, the apparatus comprising:

means for providing an image representing a target area, means for receiving an indication of a position in the image, the receiving means being adapted to correlate the indicated position to a corresponding position in the target area, means for determining the actual direction of the projectile, means for determining a launch position of the projectile, means for determining, from the launch position and the corresponding position, the predetermined direction, and means for determining the deviation between the actual direction of the projectile and the predetermined direction.

Preferably, the providing means comprise a display or monitor and a processing unit, the display or monitor being operatively connected to the processing unit and being adapted to provide the image, the receiving means preferably also comprising a pointing device also connected to the processing unit. This pointing device may be a computer mouse, an optical pen, or the like, Alternatively, the display/monitor may be a touch pad, which then also comprises the pointing device in that touching the display/monitor at a position will enter that position into the system.

In general, the means for determining the actual direction of the projectile may comprise means for determining a landing point of the projectile and means for determining, from the launch position and the landing point, the actual direction of the projectile.

As mentioned above, the providing means may comprise a camera for providing the image of the target area. This camera may be a still image camera or a video camera, digital cameras are widespread, but other types of cameras are equally useful.

In one embodiment, the providing means are adapted to provide the image comprising a plurality of predetermined positions, and the receiving means are adapted to receive an indication of one of the predetermined positions.

In addition to that or in combination with that, the target area preferably comprises a plurality of predetermined elements, wherein the providing means are adapted to provide an image illustrating or identifying the plurality of predetermined elements at positions corresponding to positions of the elements in the target area, and the receiving means are then adapted to receive an indication of a position of one of the predetermined elements. Thus, the positions could correspond to physical "targets" in the target area.

In that situation, the element at the position correlated to the indicated position could have a visible part having a predetermined size, and the receiving means could then comprise means for:

a) determining, from the indicated position in the image, an angle to the indicated element and b) determining, from the image, a distance from a predetermined position to the indicated element by correlating an extent of the visible part in the image with the predetermined size thereof, the receiving means being adapted to determine the corresponding position on the basis of the angle and the distance.

The visible part may be a part at the end of a stick and may comprise a visible pattern, from which the boundaries of the visible part or from which dimensions of the visible part may be determined.

As mentioned above, the means for determining the actual direction of the projectile may comprise means for:

receiving radiation transmitted by or reflected by the projectile while it is in flight and determining, from the received radiation, a direction of the projectile.

Thus, the means for determining the actual direction may be a RADAR system or another system adapted to determine a position/path/direction from received radiation (or sound).

The radiation may be emitted/transmitted by the projectile or it may be reflected. In the latter situation, the apparatus may further comprise means for providing radiation toward the projectile.

In this embodiment, the means for determining the launch position of the projectile may be adapted to determine the launch position from the radiation received.

In another embodiment, the means for determining the launch position of the projectile are adapted to assume that the launch is performed at a predetermined position. This is a simple manner of "obtaining" that information.

In the embodiment where the apparatus comprises the camera, it is desired that the determination of the launch position/landing position and/or the path/direction/position of the projectile are correlated to each other. This may be obtained when the camera and the radiation receiving means are fixed in relation to each other so that the radiation receiving means are adapted to receive radiation from the target area viewed by the camera.

In fact, the radiation receiving means may be directed toward the target area so that the fields of view of the radiation receiving means and the camera are either the same or one is comprised within the other—at least for the expected path or direction of the projectile.

A third aspect of the invention relates to an element for use in the above method or for use with the above apparatus, the element comprising a visible part having a predetermined size.

This visible part may be an element having any suitable shape, such as round, circular, square, which is visible from a distance. The element may have visible demarcations, such as boundaries, in order for the distance to the element to be determinable from the extent of these demarcations at that distance.

The visible part may be positioned a distance, such as a predetermined distance, from the ground and may be provided at (such as at the end of) a stick, a pole, or the like.

The visible part may be solid or may be a flag on which the demarcations are provided. The flag may then be kept in a stretched-out manner in order for the demarcations to be visible also in calm weather.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
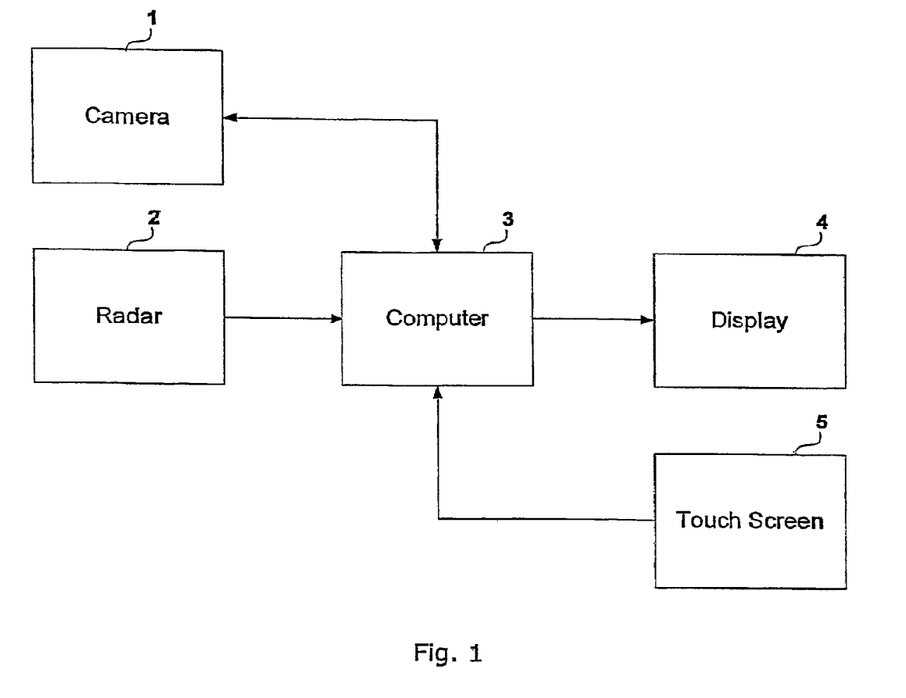
FIG. 1 is a block diagram of the main components in the present invention.

In the preferred embodiment of the present invention the projectile is a golf ball being launched towards a target, the image capturing device is a camera 1 and the measurement equipment to determine the actual projectile path is a radar 2, as shown in FIG. 1. Both the image and the radar data are sent to a computer 3, which displays the image and radar data on a display 4, to ease the identification of a target in an image, a touch screen 5 is used.

Figure 2:
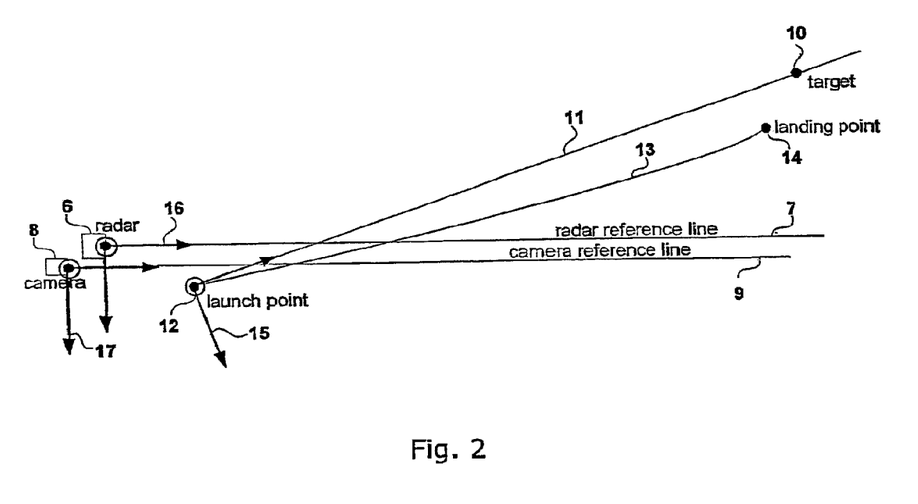
FIG. 2 shows the positions of the different coordinate systems in a top view.

Independent of the position and physical orientation of the radar, the golf ball trajectory data, and specifically the landing point, is desired in a coordinate system which has origo at the launch point 12 and with a horizontal reference line 11 that goes through the target 10. The hereby defined coordinate system is called the golfer coordinate system 15, as seen in FIG. 2.

The trajectory data is measured in the radar coordinate system 16. The image captured by the camera 8 is defined in the camera coordinate system 17.

Every golf shot will typically be launched from slightly different positions, and also the target will often change during a golf session. This means that the position and orientation of the golfer coordinate system 15 is in general different for every golf shot. This illustrates the need for an efficient way to automatically transfer measurement data from the radar coordinate system 16 into the golfer coordinate system 15.

Previous technologies define the target by mechanically adjusting the measurement system, e.g. the radar 2, to point directly at the target or in a predetermined offset from the target. In some technologies several predetermined targets positions are stored, to ease the selection between these predetermined targets, Anyhow, this means that whenever a new target, the position of which is not known a priori is selected, a new mechanical adjustment would be required.

The present embodiment of the invention does not require any mechanical adjustment as long as the desired target is in the field of view of the camera 1 and the radar 2. This field of view is typically between 10 to 30 degrees.

Previous techniques obtain the launch position by typically dictating the launch position to be within a predetermined very limited area, e.g. within a 20 cm diameter circle 2-4 m in front of the radar 2.

In the present embodiment of the invention, the launch position is directly measured by the radar 2, as being the first data point belonging to the golf ball flight. Other methods are outlined below.

The physical orientation and position of the camera 1 relative to the radar 2 must be known. This is most easily obtained by mounting the camera directly on or inside the radar, so the two units will be fixed relative to each other. The relative orientation and position is determined through a calibration procedure. When operating the system, the radar and camera units are assumed to be adjusted to be in level.

Figure 3:
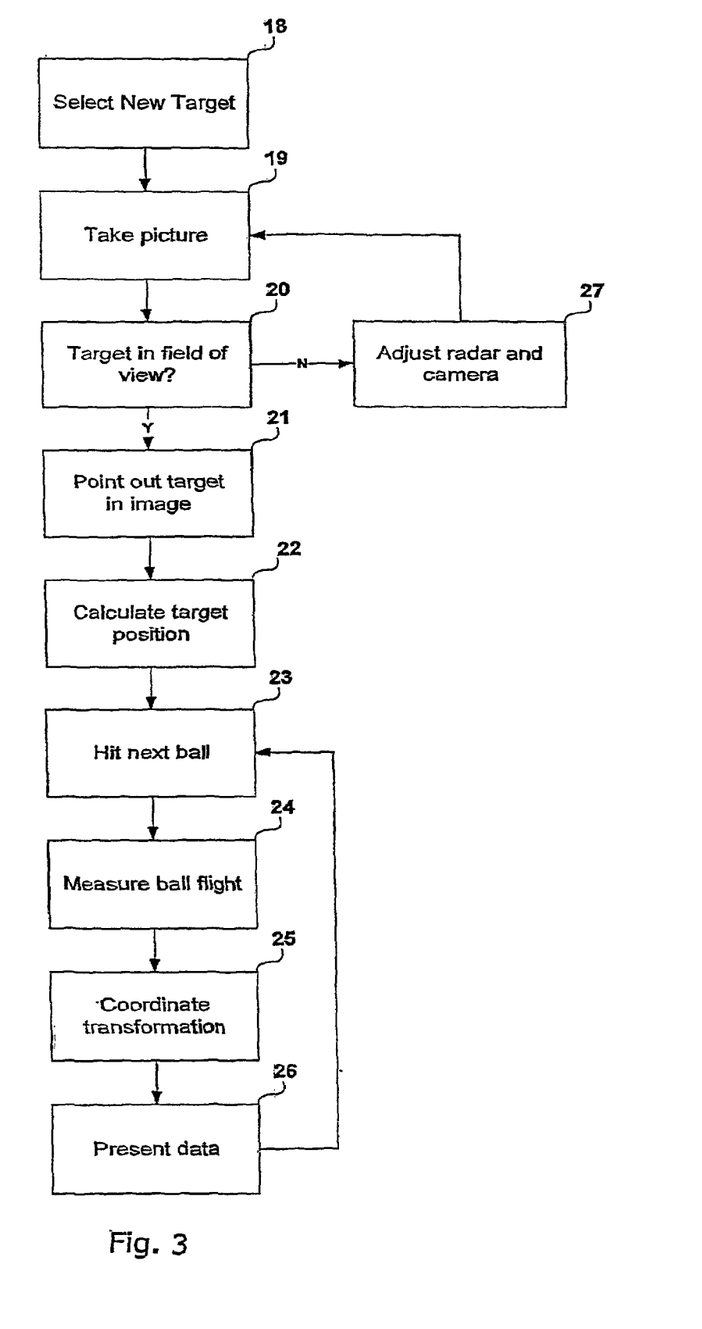
FIG. 3 is the process flow for selecting a target and getting ball flight data in the desired coordinate system.

The procedure to select a new target in the present invention is outlined in FIG. 3. First a picture is taken in step 19, which is typically initiated by the user. The captured image is displayed and the user determines the position of the preferred target in the picture 21, if more targets are present. If the target is not in the field of view, it may be necessary to perform a rough alignment 27 of the camera and radar unit.

Figure 4:
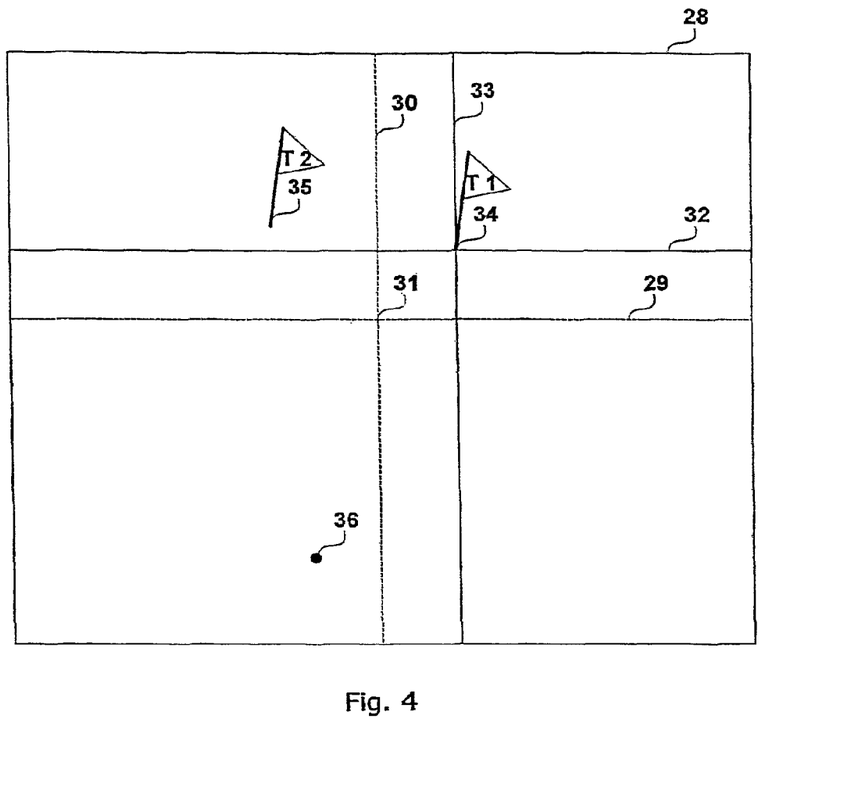
FIG. 4 shows the image of a camera looking toward the target area from behind the launch position.

The image 28 presented to the user could look like that illustrated in FIG. 4. The horizontal line 29 in the image 28 represents the horizontal plane of the coordinate system 17, and the vertical line 30 represents the vertical plane at the reference horizontal angle in the same coordinate system 17. The center 31 of the camera is consequently reference line 9.

In the image, several targets 34, 35 will typically be displayed. To point out a specific target, the vertical and horizontal reference lines 32, 33 are adjusted to pin point the exact location of the desired target 33. This adjustment can be done manually by the user by means of a keyboard, touch panel, mouse or similar. In some cases, see below, the system can also automatically detect and center the reference lines 32, 33 to point at the desired target.

Figure 5:
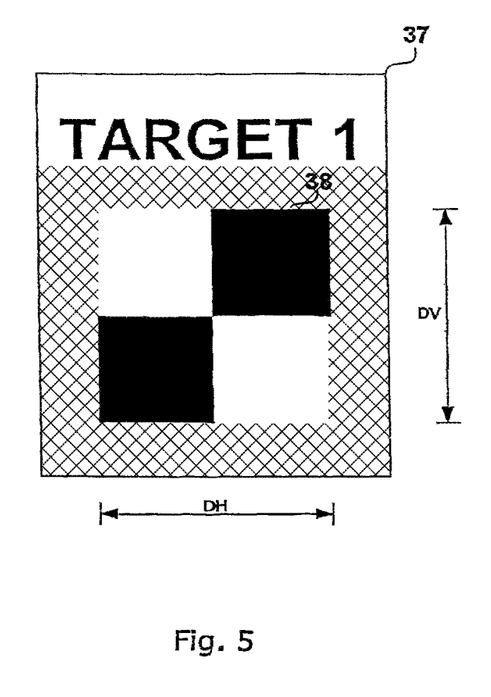
FIG. 5 shows an example of a physical layout of a target that can ease target identification.

If the target has a predetermined shape or pattern, like in FIG. 5, the system can automatically center the vertical and horizontal reference lines 32, 33. If several targets are present in the target area, the targets might preferably be of different shapes, so that the system can distinguish between them. The user will in this case either indicate the target number to the system, or point out the approximate location of the target in the image.

In the above several methods for determining the angles to the target are outlined. To calculate the target position 10, the distance to the target is also required. There are several ways to determine this distance.

One method of determining the distance to the target is to simply have the user enter the distance, which of course requires that the user knows this.

Another method of determining the distance to the target is to measure the angular extent of a predetermined pattern of the target. Knowing the size of this predetermined pattern, it is straight forward to calculate the distance to the target. One predetermined target pattern 38, that can be used for this, is shown in FIG. 5, the angular dimension DH and/or DV can easily be determined from the image 28 by edge-detection techniques.

Once the angles and the distance to target have been determined, the target position can be calculated 22.

For each ball hit, the radar measures the ball flight 13. This includes measurements of the ball launch position 12 and the ball landing point 14.

An alternative way of measuring the ball launch position is by analyzing a sequence of images 28 taken before and after launch. In this way the launched ball 36 can be identified in the image 28. Hereby the vertical and horizontal angle to the launch position from the camera 8 can be determined. The distance from the camera to the launch position can be determined in at least two ways.

The first method measures the angular extent of the ball in the image 28 and compares this with the predetermined size of the ball. For most sports balls, this size is very well defined.

The second method assumes that the radar 2 is at a given height above the launch position. Then, by knowing the vertical angle to the launch position from above, the distance can be calculated directly using the simple trigonometric relation between the parameters.

By knowing the launch position 12 and the target position 10, the golfer coordinate system 15 is determined.

The radar will measure the ball flight 13 in the radar coordinate system 16. These data are then coordinate transferred 25 in to the golfer coordinate system 15 through a 3 dimensional translation and rotation.

Finally the ball flight data are presented to the user 26.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of determining a deviation between an actual direction of a launched projectile and a predetermined direction, the method comprising:
   providing, using a camera fixed to a radar, an image representing a target area;
   receiving an indication of a position in the image, the indicated position corresponding to a position in the target area;
   determining, using the radar, the actual direction of the projectile;
   determining a launch position of the projectile;
   determining, from the launch position and the corresponding position, the predetermined direction; and
   determining the deviation between the actual direction of the projectile and the predetermined direction, wherein the receiving step comprises rotating the camera and radar to have the position in the target area presented at a center or with a predetermined offset from the center in the image.

2. A method according to claim 1, further comprising the step of mounting the camera on or inside the radar, wherein the deviation determination uses a predetermined relative orientation and position of the radar and camera.

3. A method according to claim 1, wherein the step of determining the actual direction of the projectile comprises:
receiving radiation transmitted by or reflected by the projectile while it is in flight; and
determining, from the received radiation, a direction of the projectile.

4. A method according to claim 3, wherein the step of determining the launch position comprises determining the launch position from the radiation received.

5. A method according to claim 1, wherein the step of determining the launch position comprises assuming that the launch is performed at a predetermined position.

6. An apparatus for determining a deviation between an actual direction of a launched projectile and a predetermined direction, the apparatus comprising:
a camera for providing an image representing a target area;
an input member for receiving an indication of a position in the image, the input member being adapted to correlate the indicated position to a corresponding position in the target area;
a radar for determining the actual direction of the projectile;
means for determining a launch position of the projectile;
a first computer for determining, from the launch position and the corresponding position, the predetermined direction; and
a second computer for determining the deviation between the actual direction of the projectile and the predetermined direction,
wherein the input member is configured to receive an input and subsequently determine the position as a position at a center or with a predetermined offset from the center in the image.

7. An apparatus according to claim 6, further comprising a mount for mounting the camera on or inside the radar.

8. An apparatus according to claim 6, wherein the radar is configured to:
receive radiation transmitted by or reflected by the projectile while it is in flight; and
determine, from the received radiation, a direction of the projectile.

9. An apparatus according to claim 8, wherein the means for determining the launch position of the projectile are adapted to determine the launch position from the radiation received.

10. An apparatus according to claim 6, wherein the means for determining the launch position of the projectile are adapted to assume that the launch is performed at a predetermined position.

* * * * *

UNITED STATES PATENT AND TRADEMARK OFFICE
CERTIFICATE OF CORRECTION

PATENT NO. : 9,857,459 B2
APPLICATION NO. : 14/536827
DATED : January 2, 2018
INVENTOR(S) : Tuxen Page 1 of 1

It is certified that error appears in the above-identified patent and that said Letters Patent is hereby corrected as shown below:

On the Title Page

Related U.S. Application Data section should read as follows:
"(60) Continuation of U.S. Patent Application Serial No. 13/303,889 filed on November 23, 2011, now U.S. Patent No. 8,912,945, which is a Divisional of U.S. Patent Application Serial No. 11/630,904 filed on July 20, 2009, now U.S. Patent No. 8,085,188, which is a 371 of PCT Patent Application Serial No. PCT/DK2005/000456 filed on July 1, 2005 which claims benefit of U.S. Provisional Patent Application Serial No. 60/584,483 filed on July 2, 2004."

Signed and Sealed this
Eleventh Day of June, 2019

Andrei Iancu
*Director of the United States Patent and Trademark Office*